United States Patent
Kang et al.

(10) Patent No.: US 9,244,853 B2
(45) Date of Patent: Jan. 26, 2016

(54) TUNABLE MULTI-TIERED STT-MRAM CACHE FOR MULTI-CORE PROCESSORS

(75) Inventors: Seung H. Kang, San Diego, CA (US); Xiaochun Zhu, San Diego, CA (US); Xiaoxia Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 542 days.

(21) Appl. No.: 13/571,426

(22) Filed: Aug. 10, 2012

(65) Prior Publication Data

US 2014/0047184 A1  Feb. 13, 2014

(51) Int. Cl.
*G06F 12/00* (2006.01)
*G06F 12/08* (2006.01)
*G06F 15/78* (2006.01)

(52) U.S. Cl.
CPC ........ *G06F 12/0893* (2013.01); *G06F 12/0806* (2013.01); *G06F 12/0811* (2013.01); *G06F 15/7807* (2013.01); *G06F 2212/222* (2013.01)

(58) Field of Classification Search
CPC ............ G06F 12/0806; G06F 12/0811; G06F 12/0893; G06F 15/7807
See application file for complete search history.

(56) References Cited

U.S. PATENT DOCUMENTS

| | | |
|---|---|---|
| 7,023,726 B1 | 4/2006 | Chen |
| 8,456,883 B1* | 6/2013 | Liu .................................. 365/66 |
| 2010/0077244 A1* | 3/2010 | Nowak et al. .................. 713/324 |
| 2010/0153646 A1 | 6/2010 | Chen |
| 2011/0153916 A1 | 6/2011 | Chinnaswamy |

OTHER PUBLICATIONS

Givargis T., et al., "Platune: A Tuning Framework for System-on-a-Chip Platforms", IEEE Transactions on Computer Aided Design of Integrated Circuits and Systems, IEEE Service Center, Piscataway, NJ, US, vol. 21, No. 11, Nov. 1, 2002, XP011070650, ISSN: 0278-0070.

International Search Report and Written Opinion—PCT/US2013/054004—ISA/EPO—Jan. 21, 2014.

Jog A., et al., "Cache revive: Architecting Volatile STT-RAM Caches for Enhanced Performance in CMPs", Proceedings of the 49th Annual Design Automation Conference on, DAC '12, Jan. 1, 2012, p. 243, XP055092913, New York, USA, DOI: 10.1145/2228360.2228406, ISBN: 978-1-45-031199-1, p. 1, left-hand column, line 30-line 40, p. 1, col. 2, line 4-line 9.

Texas Instruments Incorporated: "TMS320DM814x DaVinci Video Processors", Jul. 1, 2011, pp. 1-7, XP055094683.

(Continued)

*Primary Examiner* — Aracelis Ruiz
(74) *Attorney, Agent, or Firm* — Donaki D. Min; Paul Holdaway

(57) ABSTRACT

A multi-core processor is presented. The multi-core processor includes a first spin transfer torque magnetoresistive random-access memory (STT-MRAM) cache associated with a first core of the multi-core processor and tuned according to first attributes and a second STT-MRAM cache associated with a second core of the multi-core processor and tuned according to second attributes.

23 Claims, 6 Drawing Sheets

(56) References Cited

OTHER PUBLICATIONS

Title: Design of Last-level on-chip Cache Using Spin-torque Transfer RAM (STT RAM) Author(s): Xu, Wei; Sun, Hongbin; Wang, Xiaobin; Chen, Yiran; Zhang, Tong; Source: IEEE Transactions on Very Large Scale Integration (VLSI) Systems, v 19, n 3, p. 483-493, Mar. 2011; ISSN: 10638210; DOI: 10.1109/TVLSI.2009.2035509 Article number: 5352236; Publisher: Institute of Electrical and Electronics Engineers Inc.

Title: Relaxing Non-volatility for Fast and Eenergy-efficient STT-RAM Caches; Author(s): Smullen, C.W.; Mohan, V.; Nigam, A.; Gurumurthi, S.; Stan, M.R.; Source: 2011 IEEE 17th International Symposium on High Performance Computer Architecture (HPCA), 50-61, 2011; ISSN: 978-1-4244-9432-3; DOI: 10.1109/HPCA.2011.5749716; Conference: 2011 IEEE 17th International Symposium on High Performance Computer Architecture (HPCA), Feb. 12-16, 2011, San Antonio, TX, USA; Sponsor: IEEE Comput. Soc; Publisher: IEEE, Piscataway, NJ, USA.

\* cited by examiner

TUNABLE MULTI-TIERED STT-MRAM CACHE FOR MULTI-CORE PROCESSORS

TECHNICAL FIELD

The present disclosure relates generally to spin transfer torque magnetoresistive random-access memory (STT-MRAM) cache. More specifically, the disclosure relates to associating and tuning STT-MRAM cache in a multi-core processor.

BACKGROUND

Typically, multi-core processors, such as the Intel® Core™ i7 Processor, have a multi-tier memory hierarchy. Each core in the multi-core processor may have a dedicated hierarchy of cache (Level 1 (L1)-Level 2 (L2)) and may also share a lower level cache (Level 3 (L3)). The lower level cache tends to have an increased chip area, and therefore, the lower level cache tends to increase the costs associated with multi-core processors.

in some prior art systems, the embedded cache (e.g., L1-L3) tend to utilize static random access memory (SRAM). SRAM may be desirable because it is logic compatible and fast. Still, SRAM has a large size area that results in a high cost, and furthermore, SRAM tends to leak power. Therefore, the use of SRAM for the lower level cache of a multi-core processor may be undesirable due to, at least, an increased cost and power consumption.

Other prior art systems may have a hybrid cache (e.g., through silicon stacking (TSS) or package on package (PoP)). Hybrid cache refers to a system that utilizes different types of memory in the cache levels. The hybrid cache may be configured as an inter-level hybrid cache, intra-level hybrid cache, or three-dimensional (3D) hybrid cache.

FIG. 1 illustrates an example of a prior art inter-level hybrid cache 100. As illustrated in FIG. 1, the core 102 (which includes L1) and L2 cache 104 may use SRAM, and the L3 cache 106 may use a different type of memory, such as embedded dynamic random access memory (eDRAM), MRAM, or phase-change random access memory (PRAM). The inter-level hybrid cache 100 is not limited to the memory types discussed in FIG. 1 and may utilize various memory types for each cache layer 102-106.

FIG. 2 illustrates an example of a prior art intra-level hybrid cache 200. As illustrated in FIG. 2, the core 202 (with L1) and a first L2 cache 204 may use SRAM. Specifically, the first L2 cache 204 may be configured for high speed memory, and therefore, the first L2 cache 204 may utilize SRAM. Moreover, a second L2 cache 206 may be configured for slow memory, and therefore, the second L2 cache 206 may be a type of memory that is different from the type of memory used in the first L2 cache 204. For example the second L2 cache 206 may use eDRAM, MRAM, or PRAM. The intra-level hybrid cache 200 is not limited to the memory types illustrated in FIG. 2 and may utilize various memory types for each cache layer 202-206.

The inter-level or intra-level hybrid cache may use various memory technologies. Still, the inter-level cache and intra-level hybrid cache are complex and have increased fabrication costs due to the monolithic integration of various memory technologies. Therefore, the use of an inter-level or intra-level hybrid cache for the lower level cache of a multi-core processor is undesirable due to the increased costs and complexity.

FIG. 3 illustrates an example of a prior art 3D hybrid cache 300. As illustrated in FIG. 3, the core 302 (with L1) and a first L2 cache 304 may use SRAM. Moreover, a second L2 cache 306 may be configured to utilize slow memory, and therefore, the second L2 cache 306 may utilize a different type of memory, such as eDRAM, MRAM, or PRAM. Furthermore, the core 302, first L2 cache 304, and second L2 cache 306 may be defined on a single chip. The L3 cache 308, may use a memory such as PRAM, and may be defined on a separate die that is connected to the chip including the core 302, first L2 cache 304, and second L2 cache 306. That is, the L3 cache 308 is on a layer (e.g., chip) that is different from the layer including the core 302, first L2 cache 304, and second L2 cache 306.

The 3D hybrid cache may be desirable due to the use of heterogeneous memories in multiple layers and high-density memories in known good die. Still, a 3D hybrid cache specifies a multi-die solution that is stacked. Accordingly, the 3D hybrid cache may increase costs due to the stacked die. Furthermore, the stacking of the die also increases the overhead (e.g., cost, reliability).

SUMMARY

In accordance with an aspect of the disclosure, a multi-core processor is presented. The multi-core processor includes a first spin transfer torque magnetoresistive random-access memory (STT-MRAM) cache associated with a first core of the multi-core processor and tuned according to first attributes. The multi-core processor further includes a second STT-MRAM cache associated with a second core of the multi-core processor and tuned according to second attributes.

In accordance with another aspect, a multi-core processor is presented. The multi-core processor includes a first storage means associated with a first core of the multi-core processor and tuned according to first attributes. The multi-core processor also includes a second storage means associated with a second core of the multi-core processor and tuned according to second attributes.

In accordance with still yet another aspect, a method for associating caches in a multi-core processor is presented. The method includes associating a first spin transfer torque magnetoresistive random-access memory (STT-MRAM) cache with a first core of the multi-core processor and tuned according to first attributes. The method also includes associating a second STT-MRAM cache with a second core of the multi-core processor and tuned according to second attributes.

In accordance with another aspect, a method for fabricating caches for a multi-core processor is presented. The method includes tuning a first spin transfer torque magnetoresistive random-access memory (STT-MRAM) cache according to first attributes. The method also includes tuning a second STT-MRAM cache according to second attributes.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings.

DETAILED DESCRIPTION

Figure 1:
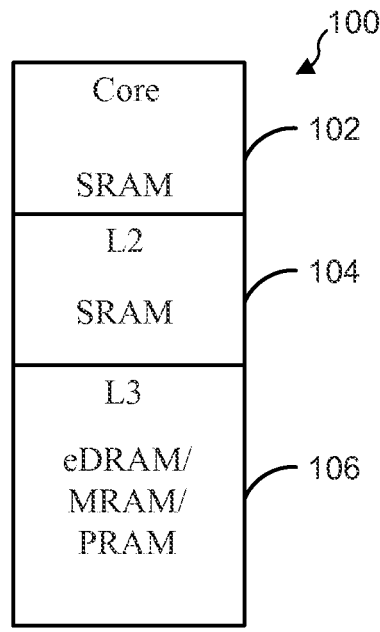
FIGS. 1-3 illustrate prior art memory systems.
Figure 2:
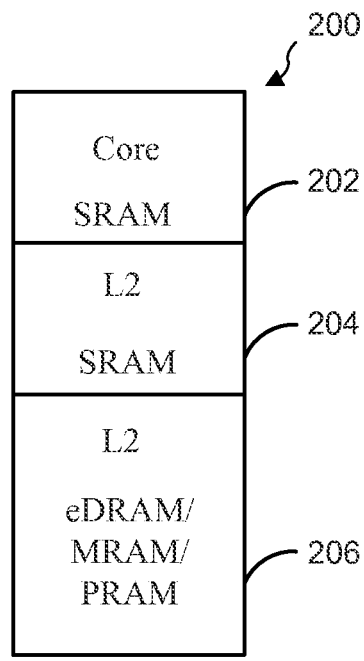
Figure 3:
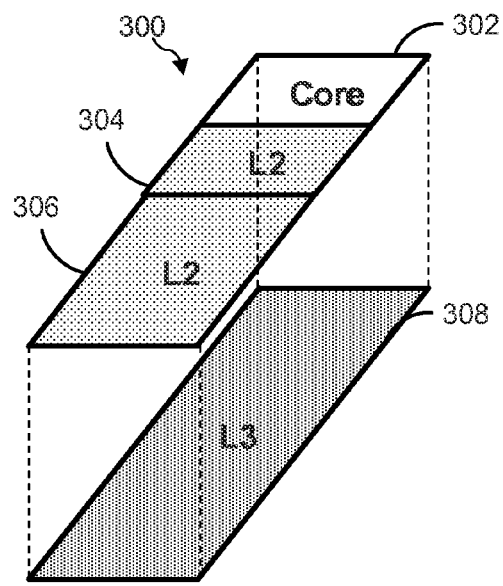

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

One aspect of the disclosure provides a lower level cache that may be tunable for speed, power, and density. While decreasing costs and complexity. In one aspect of the disclosure, a multi-tiered STT-MRAM cache for a multi-core processor is described.

Unlike conventional random access memory (RAM) chip technologies, in magnetoresistive RAM (MRAM) data is not stored as electric charge, but is instead stored by magnetic polarization of storage elements. The storage elements are formed from two ferromagnetic layers separated by a tunneling layer. One of the two ferromagnetic layers, which is referred to as the fixed layer or pinned layer, has a magnetization that is fixed in a particular direction. The other ferromagnetic magnetic layer, which is referred to as the free layer, has a magnetization direction that can be altered to represent either "1" when the free layer magnetization is anti-parallel to the fixed layer magnetization or "0" when the free layer magnetization is parallel to the fixed layer magnetization. One such device having a fixed layer, a tunneling layer, and a free layer is a magnetic tunnel junction (MTJ). The electrical resistance of an MEI depends on whether the free layer magnetization and fixed layer magnetization are parallel or anti-parallel with each other. A memory device such as RAM is built from an array of individually addressable MTJs.

STT-MRAM is a type of MRAM. The free layer magnetization of STT-MRAM may be switched by an electrical current that passes through an MTJ. Thus, STT-MRAM is differentiated from conventional MRAM which uses a magnetic field. STT-MRAM is tunable for speed, power, density, and cost. STT-MRAM may be tailored as an alternative to memories utilized for lower level cache. Furthermore, STT-MRAM cells and macros can be fabricated in multiple configurations (e.g., multi-tiered) on a monolithic die without incurring extra process steps and cost. Thus, it may be desirable to utilize the STT-MRAM as a multi-tiered lower level cache for each processor core. It should be noted that the STT-MRAM is not limited to the lower level (L3) cache and may be utilized for other cache layers (e.g., L1 or L2) as desired.

In a multi-core processor, each processor core may process different workloads, and therefore, each processor core may specify a different type of memory. For example, one processor core may specify a memory tuned for high performance while a second processor core may specify a memory tuned for low power. In a typical multi-core processor, the lower level cache is the same circuitry and is not tuned for each core. According to the present aspect, the multi-tiered STT-MRAM cache may be tuned (e.g., customized) for each processor core so that the tailored multi-tiered STT-MRAM cache may improve the efficiency of each processor core, and thereby, deliver improved chip-level power-performance. According to some aspects, each multi-tiered STT-MRAM may be shared by at least two processor cores. In the present disclosure, the term processor core may sometimes be referred to as a core.

Figure 4:
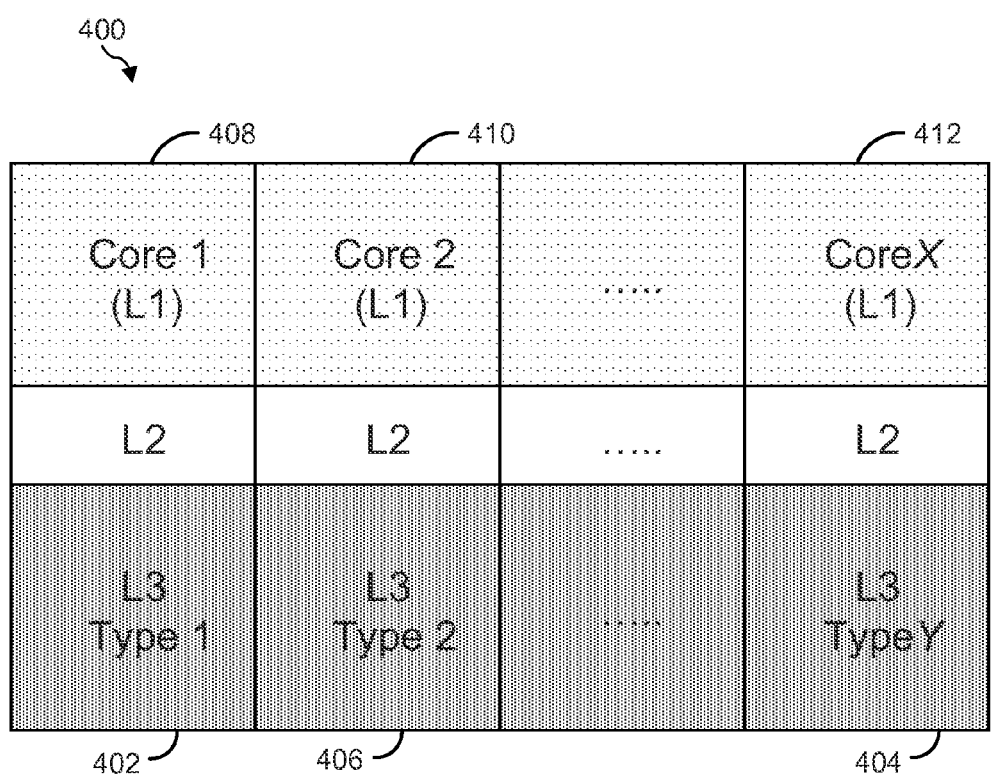
FIGS. 4-5 illustrate a multi-tiered multi-core processor utilizing an STT-MRAM cache according to an aspect of the present disclosure.

FIG. 4 illustrates a multi-tiered multi-core processor 400 utilizing an STT-MRAM cache according to an aspect of the present disclosure. As illustrated in FIG. 4, each core 108-412 (Core 1-Core X) of a multi-core processor is associated with tiers of a cache (L1-L3). The L1 and L2 caches may be dedicated to each core. It should be noted that X is equal to the number of cores and is equal to or greater than the number of STT-MRAM types that may be utilized for the cache of each core. Furthermore, Y is equal to the number to STT-MRAM cache types and Y is equal to or less than X.

As illustrated in FIG. 4, each lower level STT-MRAM cache 402-406 may be tuned according to specific attributes (Type 1-Type Y). According to one aspect, the Type 1 STT-MRAM cache 402 may be tuned with a first set of attributes for fast access (e.g., increased performance). That is, the Type 1 STT-MRAM cache 402 may be tuned to include a short latency and a fast cycle time. The size of the Type 1 STT-MRAM cache 402 cell may also be tuned to be greater (e.g., 2 transistors (T)/1 MTJ) than a typical cell size of other types of an STT-MRAM cache. According to some aspects, the size of the MTJ of the Type 1 STT-MRAM cache 402 may be smaller than the size of the MTJ of other types of STT-MRAM cache. The decreased size of the MTJ may increase the speed of a STT-MRAM cache due to an increased current density.

Furthermore, the Type Y STT-MRAM cache 404 may be tuned with a second set of attributes. In this example, the Type STT-MRAM cache 404 may be tuned for a higher density. That is, the Type F STT-MRAM cache 404 may be tuned to have a density that is greater than a density of other types of STT-MRAM cache. For example, the Type 1 STT-MRAM cache 402 may have a density of 8 megabits (Mb) and the Type Y STT-MRAM cache 404 may have a density of 16-32 Mb. The increased density of the Type Y STT-MRAM cache 404 increases the cache size, thereby, increasing a cache hit rate and decreasing a cache miss rate. To increase the density of the Type Y STT-MRAM cache 404, the cell size of the Type Y STT-MRAM cache 404 may be less than the size of other types of STT-MRAM. For example, the cell size of the Type Y STT-MRAM cache 404 may be 1 transistor-1 MTJ (1T-1J). Because the Type Y STT-MRAM cache 404 has an increased density, the Type STT-MRAM cache 404 may store data such as programming code for power-down and instant-on (e.g., portions of the operating system (OS)).

According to some aspects, the attributes may be similar for all or some STT-MRAM cache types. For example, the Type 2 STT-MRAM cache 406 may have the same attributes as the Type STT-MRAM cache 402 or the Type Y STT-MRAM cache 404. Alternatively, the attributes may be different for each type of STT-MRAM. For example, each of the attributes of the Type STT-MRAM cache 402, Type 2 STT-MRAM cache 406, and Type Y STT-MRAM cache 404 may be different. Furthermore, the tuning of the types of STT-MRAM cache is not limited to the configurations described for FIG. 4. That is, the STT-MRAM be tuned for various configurations, such as, for example, security, performance, reliability, data type, power, usage, density, and other configurations associated with various memory types.

Figure 5:
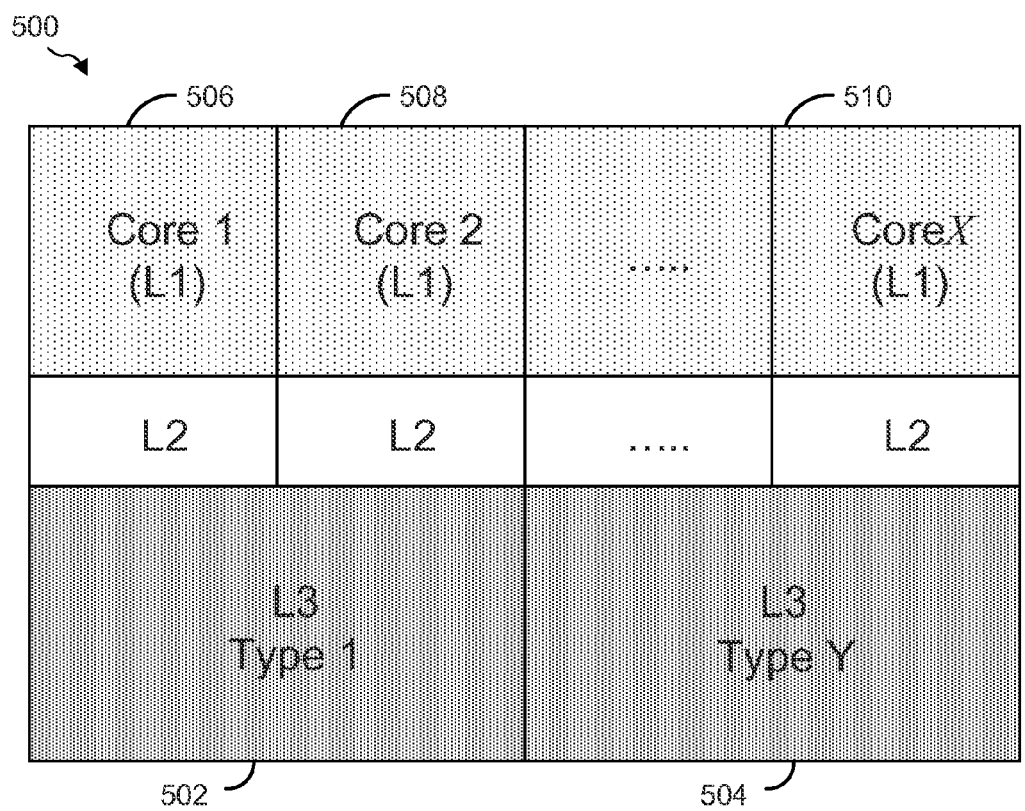

FIG. 5 illustrates a multi-tiered multi-core processor 500 utilizing STT-MRAM cache according to another aspect of the present disclosure. As illustrated in FIG. 5, each core 506-510 (Core 1-Core X) of a multi-core processor is associated with a high level cache (L1) and mid-level cache (L2), furthermore, a lower level cache (L3) is shared between the cores. It should be noted that X is equal to the number of cores and the STT-MRAM cache may be shared between the cores when X is greater than two. Furthermore, Y is equal to the number to STT-MRAM cache types and Y is equal to or less than X.

As illustrated in FIG. 5, each lower level STT-MRAM cache may be tuned according to specific attributes (Type 1-Type Y). Furthermore, the Type STT-MRAM cache 502 may be a shared cache for Core 1 506 and Core 2 510 and the Type Y STT-MRAM cache 504 may be a shared cache for all other cores. According to one aspect, the Type 1 STT-MRAM cache 502 may be tuned according to a first set of attributes and the Type Y STT-MRAM cache 504 may be tuned according to a second set of attributes. Furthermore, the sharing of the STT-MRAM cache is not limited to the aspect illustrated in FIG. 5, the STT-MRAM cache may be shared by more than two cores and some cores may not share an STT-MRAM cache in the shared configuration. That is, some types of STT-MRAM cache may only be associated with one core while other types of STT-MRAM cache may be shared amongst cores.

As previously discussed, the types of STT-MRAM may be tuned according to specific attributes. The attributes may include latency, cache hit/miss rate, energy, energy-delay product (e.g., combination of performance and energy consumption), data utilization (e.g., duty factor: read, write, or hold/store), and data reliability and security (e.g., strong data retention and protection). The aforementioned attributes are examples of various attributes that may be configured to tune the types of STT-MRAM cache, the present disclosure is not limited to the aforementioned attributes and is contemplated for other attributes. It should be noted that in the present disclosure attributes include parameters.

The various attributes allow for each STT-MRAM cache to be tailored for performance (e.g., latency, cache hit/miss rate), data type usage, reliability, power, and density. Furthermore, the STT-MRAM cache utilizes a homogeneous lower level process integration resulting in no extra process overhead because the different tiers of the lower level cache are simultaneously fabricated. That is, the same fabrication processes may be used for each type of STT-MRAM cache with only slight variation in the overall process flow. For example, different mask layouts may be used within the same process flow to create the differently tuned caches.

Moreover, the use of an STT-MRAM cache may decrease chip costs. That is, the STT-MRAM cache may use less space in comparison to the SRAM cache. For example, according to some aspects, the STT-MRAM cache may save approximately two to three times the area in comparison to an SRAM lower level cache of the same density.

Figure 6:
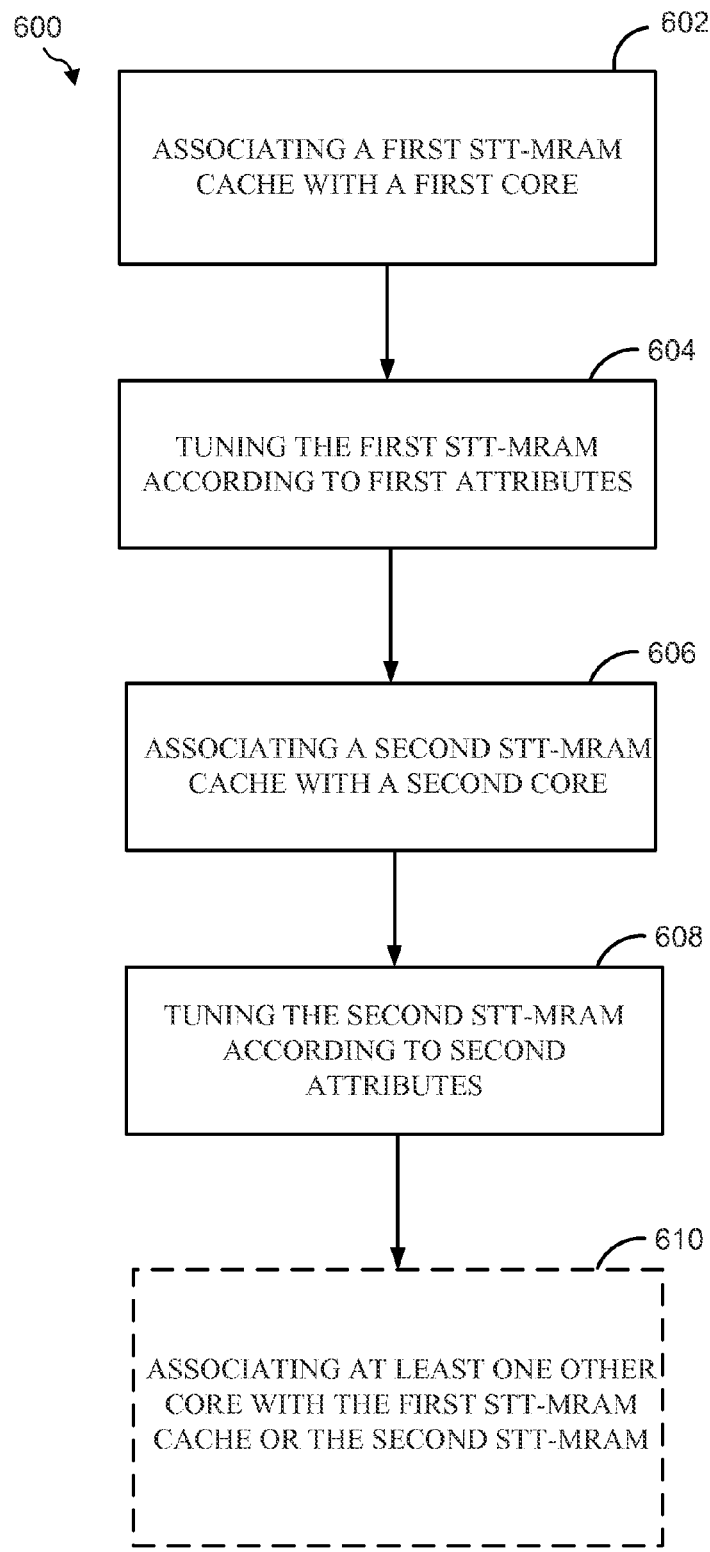
FIG. 6 illustrates a block diagram for a method of associating and tuning an STT-MRAM cache in a multi-core processor according to an aspect of the present disclosure.

FIG. 6 illustrates a block diagram of a method for associating and tuning STT-MRAM caches 600. As illustrated in FIG. 6, as shown in block 602, a first STT-MRAM cache is associated with a first core. As shown in block 604, the first STT-MRAM is tuned according to first attributes. Furthermore, as shown in block 606, a second STT-MRAM cache is associated with a second core. Additionally, the second STT-MRAM is tuned according to second attributes, as shown in block 608. The method may also include associating at least one other core with the first STT-MRAM cache or the second STT-MRAM, as shown in block 610.

Figure 7:
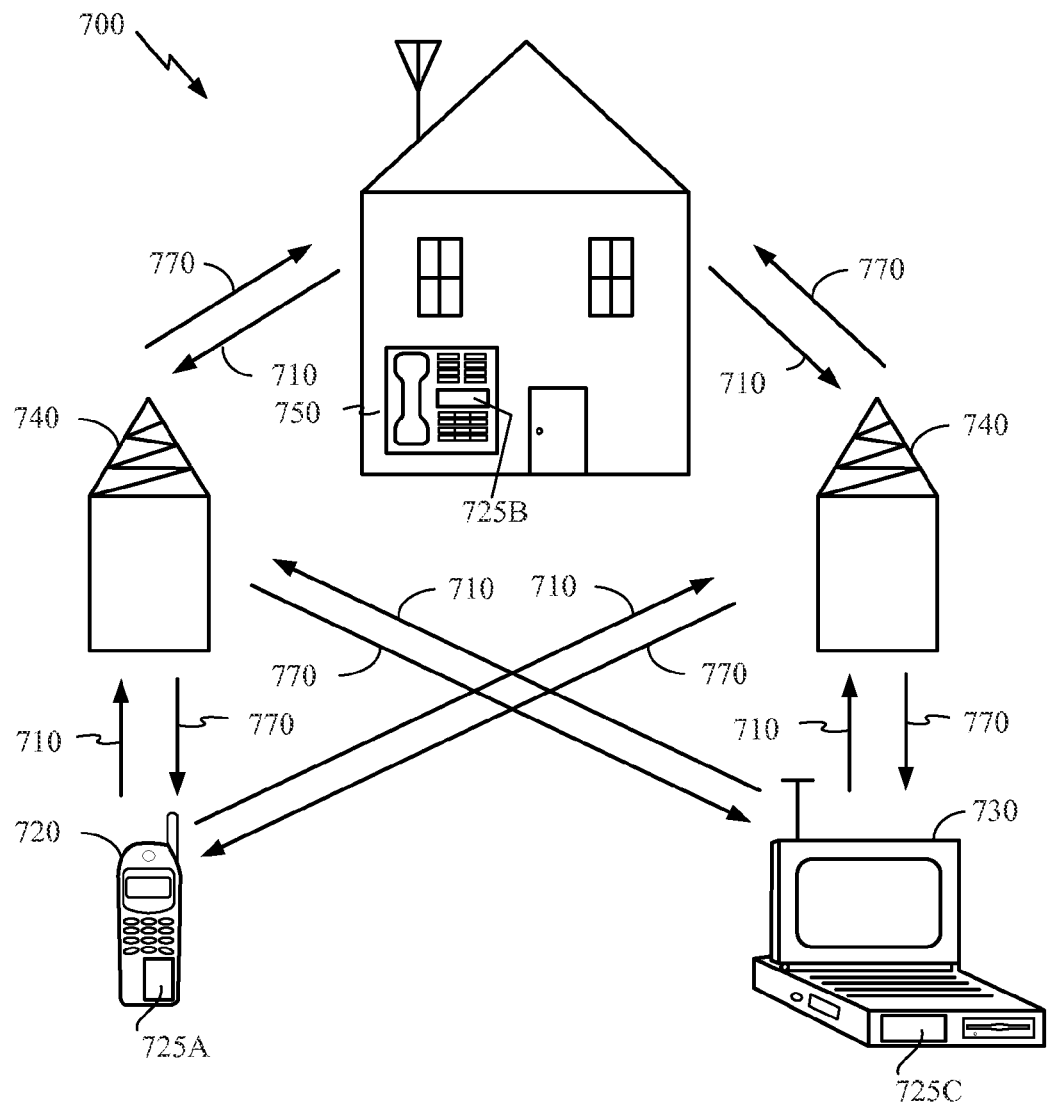
FIG. 7 illustrates an exemplary wireless communication system in which an embodiment of the disclosure may be advantageously employed.

FIG. 7 shows an exemplary wireless communication system 700 in which an embodiment of the disclosure may be advantageously employed. For purposes of illustration, FIG. 7 shows three remote units 720, 730, and 750 and two base stations 740. It will be recognized that wireless communication systems may have many more remote units and base stations. Remote units 720, 730, and 750 include multi-core processors with lower level STT-MRAM cache 725A, 725B, 725C. FIG. 7 shows forward link signals 770 from the base stations 740 and the remote units 720, 730, and 750 and reverse link signals 710 from the remote units 720, 730, and 750 to base stations 740.

In FIG. 7, the remote unit 720 is shown as a mobile telephone, remote unit 730 is shown as a portable computer, and remote unit 750 is shown as a fixed location remote unit in a wireless local loop system. For example, the remote units may be cell phones, hand-held personal communication systems (PCS) units, a set top box, a music player, a video player, an entertainment unit, a navigation device, portable data units, such as personal data assistants, or fixed location data units such as meter reading equipment. Although FIG. 7 illustrates remote units, which may employ multi-core processors with lower level STT-MRAM cache 725A, 725B, 725C according to the teachings of the disclosure, the disclosure is not limited to these exemplary illustrated units. For instance, multi-core processors with lower level STT-MRAM cache according to aspects of the present disclosure may be suitably employed in any device.

Figure 8:
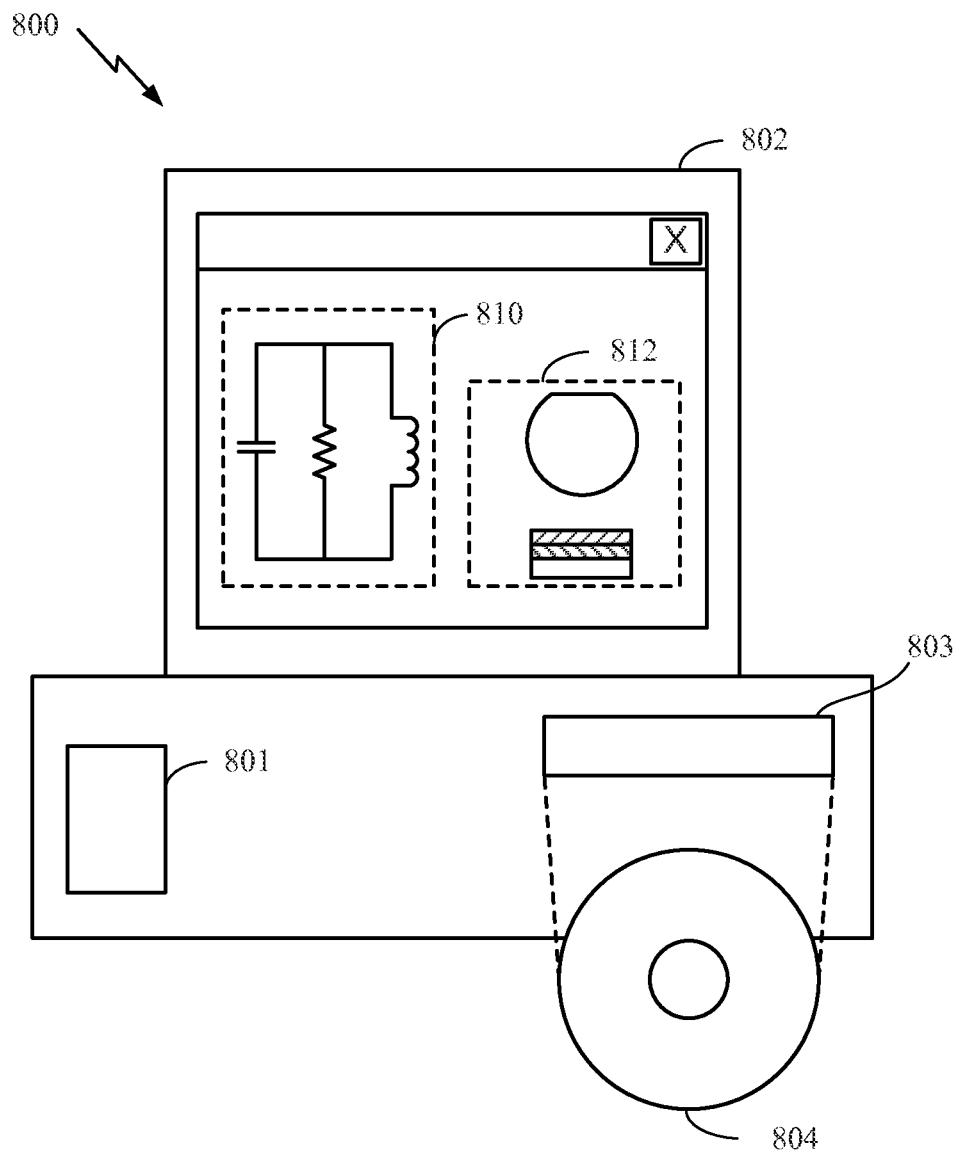
FIG. 8 is a block diagram illustrating a design workstation used for circuit, layout, and logic design of a semiconductor component according to one aspect of the present disclosure.

FIG. 8 is a block diagram illustrating a design workstation used for circuit, layout, and logic design of a semiconductor component, such as the multi-core processor with lower level STT-MRAM cache disclosed above. A design workstation 800 includes a hard disk 801 containing operating system software, support files, and design software such as Cadence or OrCAD. The design workstation 800 also includes a display 802 to facilitate design of a circuit 810 or a semiconductor component 812 such as the multi-core processor with lower level STT-MRAM. A storage medium 804 is provided for tangibly storing the circuit design 810 or the semiconductor component 812. The circuit design 810 or the semiconductor component 812 may be stored on the storage medium 804 in a file format such as GDSII or GERBER. The storage medium 804 may be a CD-ROM, DVD, hard disk, flash memory, or other appropriate device. Furthermore, the design workstation 800 includes a drive apparatus 803 for accepting input from or writing output to the storage medium 804.

Data recorded on the storage medium 804 may specify logic circuit configurations, pattern data for photolithography masks, or mask pattern data for serial write tools such as electron beam lithography. The data may further include logic verification data such as timing diagrams or net circuits associated with logic simulations. Providing data on the storage medium 804 facilitates the design of the circuit design 810 or the semiconductor component 812 by decreasing the number of processes for designing semiconductor wafers.

In one configuration, the memory apparatus includes a first storage means associated with a first core of the multi-core processor and tuned according to first attributes. The memory apparatus also includes a second storage means associated with a second core of the multi-core processor and tuned according to second attributes. The storage means may be a lower level STT-MRAM cache 402-406 502-504, a level two (L2) cache, and/or other memory types configured to perform the functions recited by the identifying means.

Although specific circuitry has been se forth, it will be appreciated by those skilled in the art that not all of the disclosed circuitry is required to practice the disclosed embodiments. Moreover, certain well known circuits have not been described, to maintain focus on the disclosure.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine or computer readable medium tangibly embodying instructions may be used in implementing the methodologies described herein. For example, software code may be stored in a memory and executed by a processor. When executed by the processor, the executing software code generates the operational environment that implements the various methodologies and functionalities of the different aspects of the teachings presented herein. Memory may be implemented within the processor or external to the processor. As used herein, the term "memory" refers to any type of long term, short term, volatile, nonvolatile, or other memory and is not to be limited to any particular type of memory or number of memories, or type of media upon which memory is stored.

The machine or computer readable medium that stores the software code defining the methodologies and functions described herein includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. As used herein, disk and/or disc includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present teachings and their advantages have been described in detail, it should be understood that various changes, substitutions and alterations can be made herein without departing from the technology of the teachings as defined by the appended claims. Moreover, the scope of the present application is not intended to be limited to the particular aspects of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding aspects described herein may be utilized according to the present teachings. Accordingly, the appended claims are intended to include within their scope such processes, machines, manufacture, compositions of matter, means, methods, or steps.

What is claimed is:

1. A multi-core processor, comprising:
  a first spin transfer torque magnetoresistive random-access memory (STT-MRAM) cache comprising a first type of metal tunnel junctions (MTJs) having a first size and associated with a first core of the multi-core processor and tuned according to first attributes; and
  a second STT-MRAM cache comprising a second type of MTJs having a second size that is greater than the first type of MTJs and associated with a second core of the multi-core processor and tuned according to second attributes, wherein the first attributes are different from the second attributes, at least one other core is associated with the first STT-MRAM cache or the second STT-MRAM cache, and each of the first STT-MRAM cache and the second STT-MRAM cache is configurable as a lower level cache, a mid-level cache or a high level cache.

2. The multi-core processor of claim 1, in which the first STT-MRAM cache and the second STT-MRAM cache are a lower level cache.

3. The multi-core processor of claim 1, in which the first STT-MRAM cache and the second STT-MRAM cache are a mid-level cache.

4. The multi-core processor of claim 1, in which the first STT-MRAM cache and the second STT-MRAM cache are embedded or monolithically integrated with each core.

5. The multi-core processor of claim 1, in which the first attributes and second attributes comprise at least latency, cache hit/miss rate, energy, energy-delay product, data utilization, area size, capacity size, and/or data reliability.

6. The multi-core processor of claim 1, in which each core is associated with one type of STT-MRAM cache.

7. The multi-core processor of claim 1, further comprising a third STT-MRAM cache associated with a third core of the multi-core processor and tuned according to third attributes.

8. The multi-core processor of claim 1, in which the first STT-MRAM cache and the second STT-MRAM cache are fabricated utilizing a homogeneous lower level integration process.

9. The multi-core processor of claim 1, wherein the multi-core processor is integrated in a mobile phone, a set top box, a music player, a video player, an entertainment unit, a navigation device, a computer, a hand-held personal communication systems (PCS) unit, a portable data unit, and/or a fixed location data unit.

10. A multi-core processor, comprising:
   a first storage means comprising a first type of spin transfer torque (STT) magnetoresistive means having a first size associated with a first core of the multi-core processor and tuned according to first attributes; and
   a second storage means comprising a second type of STT magnetoresistive means having a second size that is greater than the first type of STT magnetoresistive means associated with a second core of the multi-core processor and tuned according to second attributes, wherein the first attributes are different from the second attributes, at least one other core is associated with the first storage means or the second storage means, and each of the first storage means and the second storage means is configurable as a lower level cache, a mid-level cache or a high level cache.

11. The multi-core processor of claim 10, integrated in a mobile phone, a set top box, a music player, a video player, an entertainment unit, a navigation device, a computer, a hand-held personal communication systems (PCS) unit, a portable data unit, and/or a fixed location data unit.

12. A method for associating caches in a multi-core processor, comprising:
   a step of associating a first spin transfer torque magnetoresistive random-access memory (STT-MRAM) cache comprising a first type of metal tunnel junctions (MTJs) having a first size with a first core of the multi-core processor and tuned according to first attributes;
   a step of associating a second STT-MRAM cache with a second core of the multi-core processor comprising a second type of MTJs having a second size that is greater than the first type of MTJs and tuned according to second attributes, wherein the first attributes are different from the second attributes and each of the first STT-MRAM cache and the second STT-MRAM cache is configurable as a lower level cache, a mid-level cache or a high level cache; and
   a step of associating the first STT-MRAM cache or the second STT-MRAM cache with at least one other core.

13. The method of claim 12, further comprising a step of integrating the multi-core processor in a mobile phone, a set top box, a music player, a video player, an entertainment unit, a navigation device, a computer, a hand-held personal communication systems (PCS) unit, a portable data unit, and/or a fixed location data unit.

14. A method for associating caches in a multi-core processor, comprising:
   associating a first spin transfer torque magnetoresistive random-access memory (STT-MRAM) cache comprising a first type of metal tunnel junctions (MTJs) having a first size with a first core of the multi-core processor and tuned according to first attributes;
   associating a second STT-MRAM cache comprising a second type of MTJs having a second size that is greater than the first type of MTJs with a second core of the multi-core processor and tuned according to second attributes, wherein the first attributes are different from the second attributes, and each of the first STT-MRAM cache and the second STT-MRAM cache is configurable as a lower level cache, a mid-level cache or a high level cache; and
   associating the first STT-MRAM cache or the second STT-MRAM cache with at least one other core.

15. The method of claim 14, in which the first STT-MRAM cache and the second STT-MRAM cache are a lower level cache.

16. The method of claim 14, in which the associating comprises embedding or monolithically integrating the first STT-MRAM cache and the second STT-MRAM cache with each core.

17. The method of claim 14, further comprising integrating the multi-core processor in a mobile phone, a set top box, a music player, a video player, an entertainment unit, a navigation device, a computer, a hand-held personal communication systems (PCS) unit, a portable data unit, and/or a fixed location data unit.

18. A method for fabricating caches for a multi-core processor, the method comprising:
   tuning a first spin transfer torque magnetoresistive random-access memory (STT-MRAM) cache comprising a first type of metal tunnel junctions (MTJs) having a first size according to first attributes;
   tuning a second STT-MRAM cache comprising a second type of MTJs having a second size that is greater than the first type of MTJs according to second attributes, wherein the first attributes are different from the second attributes, and each of the first STT-MRAM cache and the second STT-MRAM cache is configurable as a lower level cache, a mid-level cache or a high level cache; and
   associating the first STT-MRAM cache or the second STT-MRAM cache with at least one other core.

19. The method of claim 18, in which the first attributes and second attributes comprise at least latency, cache hit/miss rate, energy, energy-delay product, data utilization, area size, capacity size, and/or data reliability.

20. The method of claim 19, further comprising utilizing a homogeneous lower level integration process when tuning the first STT-MRAM cache and the second STT-MRAM cache.

21. The method of claim 18, further comprising integrating the multi-core processor in a mobile phone, a set top box, a music player, a video player, an entertainment unit, a navigation device, a computer, a hand-held personal communication systems (PCS) unit, a portable data unit, and/or a fixed location data unit.

22. A method for fabricating caches for a multi-core processor, the method comprising:
   a step of tuning a first spin transfer torque magnetoresistive random-access memory (STT-MRAM) cache comprising a first type of metal tunnel junctions (MTJs) having a first size according to first attributes;
   a step of tuning a second STT-MRAM cache comprising a second type of MTJs having a second size that is greater than the first type of MTJs according to second attributes, wherein the first attributes are different from the second attributes, and each of the first STT-MRAM cache and the second STT-MRAM cache is configurable as a lower level cache, a mid-level cache or a high level cache; and
   a step of associating the first STT-MRAM cache or the second STT-MRAM cache with at least one other core.

23. The method of claim 22, further comprising a step of integrating the multi-core processor in a mobile phone, a set top box, a music player, a video player, an entertainment unit, a navigation device, a computer, a hand-held personal communication systems (PCS) unit, a portable data unit, and/or a fixed location data unit.

* * * * *